United States Patent
Gitelman et al.

(10) Patent No.: US 10,311,047 B2
(45) Date of Patent: Jun. 4, 2019

(54) STREAMLINED CREATION AND UPDATING OF OLAP ANALYTIC DATABASES

(71) Applicant: salesforce.com, inc., San Francisco, CA (US)

(72) Inventors: Alex Gitelman, Berkeley, CA (US); Ravishankar Arivazhagan, Belmont, CA (US); Donovan Schneider, San Francisco, CA (US); Alex Field, San Francisco, CA (US); Pradeep Mantha, San Francisco, CA (US); Puneet Gupta, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 282 days.

(21) Appl. No.: 15/358,128

(22) Filed: Nov. 21, 2016

(65) Prior Publication Data

US 2018/0107705 A1 Apr. 19, 2018

Related U.S. Application Data

(60) Provisional application No. 62/410,313, filed on Oct. 19, 2016.

(51) Int. Cl.
| | |
|---|---|
| *G06F 17/30* | (2006.01) |
| *G06F 16/23* | (2019.01) |
| *G06F 16/27* | (2019.01) |
| *G06F 16/25* | (2019.01) |
| *G06F 16/28* | (2019.01) |

(52) U.S. Cl.
CPC ........ *G06F 16/2379* (2019.01); *G06F 16/254* (2019.01); *G06F 16/27* (2019.01); *G06F 16/283* (2019.01)

(58) Field of Classification Search
CPC ......... G06F 17/30312; G06F 17/30554; G06F 17/30575; G06F 17/30592; G06F 17/30377; G06F 17/24561
See application file for complete search history.

(56) References Cited

U.S. PATENT DOCUMENTS

| | | |
|---|---|---|
| 5,999,192 A | 12/1999 | Selfridge et al. |
| 6,105,051 A | 8/2000 | Borkenhagen et al. |
| 6,212,544 B1 | 4/2001 | Borkenhagen et al. |
| 6,480,876 B2 | 11/2002 | Rehg et al. |
| 6,697,935 B1 | 2/2004 | Borkenhagen et al. |
| 6,757,689 B2 | 6/2004 | Battas et al. |
| 6,995,768 B2 | 2/2006 | Jou et al. |

(Continued)

OTHER PUBLICATIONS

Liu, Xiufeng et al, Optimizing ETL by a Two-level Data Staging Method, Jul. 1, 2016, International Journal of Data Warehousing and Mining, 12(3), 32-50 (Year: 2016).*

(Continued)

*Primary Examiner* — Jean M Corrielus
(74) *Attorney, Agent, or Firm* — Holland & Hart LLP

(57) ABSTRACT

The technology disclosed relates to creating and frequently updating multiple online analytic processing (OLAP) analytic databases from an online transaction processing (OLTP) transaction updatable system that includes transaction commit, rollback, and field level security capabilities. It also relates to transparently decoupling extraction from rebuilding of frequently updated OLAP analytic databases from the OLTP transaction updatable system.

20 Claims, 8 Drawing Sheets

(56) References Cited

U.S. PATENT DOCUMENTS

| | | | |
|---|---|---|---|
| 7,228,352 B1 | 6/2007 | Yaguchi et al. |
| 7,278,115 B1 | 10/2007 | Conway et al. |
| 7,356,840 B1 | 4/2008 | Bedell et al. |
| 7,380,213 B2 | 5/2008 | Pokorny et al. |
| 7,571,191 B2 | 8/2009 | Dill et al. |
| 7,590,641 B1 | 9/2009 | Olson |
| 7,711,750 B1 | 5/2010 | Dutta et al. |
| 7,756,335 B2 | 7/2010 | Sternby |
| 7,818,728 B1 | 10/2010 | Olson |
| 7,836,178 B1 | 11/2010 | Bedell et al. |
| 7,840,518 B1 | 11/2010 | Rubin |
| 8,041,670 B2 | 10/2011 | Bakalash et al. |
| 8,045,800 B2 | 10/2011 | Tang et al. |
| 8,086,585 B1 | 12/2011 | Brashers et al. |
| 8,271,992 B2 | 9/2012 | Chatley et al. |
| 8,285,709 B2 | 10/2012 | Candea et al. |
| 8,302,020 B2 | 10/2012 | Louch et al. |
| 8,321,865 B2 | 11/2012 | Amini et al. |
| 8,326,848 B2 | 12/2012 | Dellinger et al. |
| 8,375,041 B2 | 2/2013 | Webster et al. |
| 8,448,170 B2 | 5/2013 | Wipfel et al. |
| 8,521,758 B2 | 8/2013 | Nachnani et al. |
| 8,549,602 B2 | 10/2013 | Vaeth |
| 8,555,286 B2 | 10/2013 | Flores et al. |
| 8,793,759 B2 | 7/2014 | Nishizawa et al. |
| 8,805,971 B1 | 8/2014 | Roth et al. |
| 8,826,390 B1 | 9/2014 | Varda |
| 8,839,087 B1 | 9/2014 | Hayden |
| 8,976,955 B2 | 3/2015 | Liberman Ben-Ami et al. |
| 9,128,995 B1 | 9/2015 | Fletcher et al. |
| 9,171,020 B2 * | 10/2015 | Faerber ................. G06F 16/215 |
| 9,449,188 B2 | 9/2016 | Schneider et al. |
| 9,536,107 B2 | 1/2017 | Soman et al. |
| 9,646,150 B2 | 5/2017 | Toth |
| 9,740,715 B2 * | 8/2017 | Faerber ................. G06F 16/215 |
| 2003/0144868 A1 | 7/2003 | MacIntyre et al. |
| 2003/0200436 A1 | 10/2003 | Eun et al. |
| 2004/0085316 A1 | 5/2004 | Malik |
| 2004/0215656 A1 | 10/2004 | Dill et al. |
| 2004/0236726 A1 | 11/2004 | Ewing et al. |
| 2005/0097060 A1 | 5/2005 | Lee et al. |
| 2005/0177570 A1 | 8/2005 | Dutta et al. |
| 2005/0182684 A1 | 8/2005 | Dawson et al. |
| 2005/0262073 A1 | 11/2005 | Reed et al. |
| 2007/0283287 A1 | 12/2007 | Taylor et al. |
| 2008/0104531 A1 | 5/2008 | Stambaugh |
| 2008/0109740 A1 | 5/2008 | Prinsen et al. |
| 2008/0163099 A1 | 7/2008 | Gu et al. |
| 2008/0165970 A1 | 7/2008 | Chung et al. |
| 2008/0201233 A1 * | 8/2008 | Schellinger ............ G06Q 10/10 705/24 |
| 2009/0049013 A1 | 2/2009 | Kumbi et al. |
| 2009/0096812 A1 | 4/2009 | Boixel et al. |
| 2009/0106656 A1 | 4/2009 | Handy et al. |
| 2009/0187586 A1 | 7/2009 | Olson |
| 2009/0189915 A1 | 7/2009 | Mercer et al. |
| 2010/0036893 A1 | 2/2010 | Serval et al. |
| 2010/0070968 A1 | 3/2010 | Poulsen et al. |
| 2010/0161643 A1 | 6/2010 | Gionis et al. |
| 2010/0169268 A1 | 7/2010 | John et al. |
| 2010/0177051 A1 | 7/2010 | Bilow |
| 2010/0250485 A1 | 9/2010 | Dodds et al. |
| 2011/0035374 A1 | 2/2011 | Vadrevu et al. |
| 2011/0078708 A1 | 3/2011 | Dokovski et al. |
| 2011/0106853 A1 | 5/2011 | Baker et al. |
| 2011/0119251 A1 | 5/2011 | Yu |
| 2011/0167256 A1 | 7/2011 | Lee et al. |
| 2011/0295841 A1 | 12/2011 | Sityon et al. |
| 2011/0314047 A1 | 12/2011 | Koronthaly et al. |
| 2012/0089902 A1 | 4/2012 | Sheflin |
| 2012/0144332 A1 | 6/2012 | Sola |
| 2012/0310931 A1 | 12/2012 | Oliver et al. |
| 2012/0331536 A1 | 12/2012 | Chabbewal et al. |
| 2013/0086870 A1 | 4/2013 | Pong |
| 2013/0103538 A1 | 4/2013 | Scholl et al. |
| 2013/0132091 A1 | 5/2013 | Skerpac |
| 2013/0141428 A1 | 6/2013 | Gipson |
| 2013/0144868 A1 | 6/2013 | Ickman et al. |
| 2013/0179769 A1 | 7/2013 | Gurfinkel et al. |
| 2013/0275904 A1 | 10/2013 | Bhaskaran et al. |
| 2013/0300743 A1 | 11/2013 | Degrell et al. |
| 2013/0311454 A1 | 11/2013 | Ezzat |
| 2014/0033019 A1 | 1/2014 | Zhang et al. |
| 2014/0052713 A1 | 2/2014 | Schauer et al. |
| 2014/0053091 A1 | 2/2014 | Hou et al. |
| 2014/0074771 A1 | 3/2014 | He et al. |
| 2014/0089318 A1 | 3/2014 | Liu et al. |
| 2014/0101091 A1 * | 4/2014 | Brown ................. G06F 16/254 707/602 |
| 2014/0122439 A1 * | 5/2014 | Faerber ................. G06F 16/215 707/683 |
| 2014/0157106 A1 | 6/2014 | Bertram et al. |
| 2014/0172776 A1 | 6/2014 | Liu et al. |
| 2014/0258970 A1 | 9/2014 | Brown et al. |
| 2014/0289408 A1 | 9/2014 | Ishino |
| 2014/0310232 A1 | 10/2014 | Plattner et al. |
| 2014/0372319 A1 | 12/2014 | Wolovitz |
| 2015/0032620 A1 | 1/2015 | Castinado et al. |
| 2015/0047003 A1 | 2/2015 | Khan |
| 2015/0058931 A1 | 2/2015 | Miu et al. |
| 2015/0088807 A1 | 3/2015 | Toppin et al. |
| 2015/0120567 A1 | 4/2015 | Van Rooyen et al. |
| 2015/0229638 A1 | 8/2015 | Loo |
| 2015/0317748 A1 | 11/2015 | Roberts et al. |
| 2016/0042016 A1 * | 2/2016 | Faerber ................. G06F 16/215 707/692 |
| 2016/0044040 A1 | 2/2016 | Caffary, Jr. |
| 2016/0062555 A1 | 3/2016 | Ward et al. |
| 2016/0104003 A1 | 4/2016 | Schneider et al. |
| 2016/0210332 A1 | 7/2016 | Milton et al. |
| 2017/0004177 A1 * | 1/2017 | Faerber ............. G06F 16/24561 |
| 2017/0132296 A1 * | 5/2017 | Ding ................. G06F 17/30554 |
| 2017/0286454 A1 * | 10/2017 | Saeki ...................... G06F 12/00 |
| 2017/0329835 A1 * | 11/2017 | Lee ................... G06F 17/30592 |
| 2017/0351718 A1 * | 12/2017 | Faerber ................. G06F 16/215 |

OTHER PUBLICATIONS

U.S. Appl. No. 14/512,267—Final Office Action dated Feb. 15, 2017, 17 pages.

U.S. Appl. No. 14/512,230—Response to Office Action dated Apr. 27, 2016, filed Aug. 25, 2016, 15 pages.

U.S. Appl. No. 14/512,267—Response to Final Office Action dated Feb. 15, 2017, filed Apr. 13, 2017, 17 pages.

U.S. Appl. No. 14/512,274—Response to Office Action dated Jan. 13, 2017, filed Apr. 5, 2017, 16 pages.

U.S. Appl. No. 14/512,274—Final Office Action dated Apr. 21, 2017, 39 pages.

U.S. Appl. No. 14/598,157—Response to Office Action dated Jan. 30, 2017, filed May 1, 2017, 25 pages.

U.S. Appl. No. 14/512,258—Notice of Allowance dated May 1, 2017, 15 pages.

U.S. Appl. No. 14/512,263—Response to Office Action dated Feb. 13, 2017 filed May 12, 2017, 19 pages.

U.S. Appl. No. 14/512,263—Final Office Action dated May 24, 2017, 35 pages.

U.S. Appl. No. 14/512,274—Response to Final Office Action dated Apr. 21, 2017, filed Jun. 27, 2017, 16 pages.

U.S. Appl. No. 14/598,157—Final Office Action dated May 26, 2017, 98 pages.

U.S. Appl. No. 14/512,267—Non-final Office Action dated Sep. 1, 2017, 26 pages.

U.S. Appl. No. 15/229,024—Non-final Office Action dated Sep. 22, 2017, 34 pages.

U.S. Appl. No. 14/598,157—Response to Final Office Action dated May 26, 2017, filed Oct. 27, 2017, 23 pages.

U.S. Appl. No. 15/229,024—Response to Non-final Office Action dated Sep. 22, 2017, filed Oct. 30, 2017, 9 pages.

U.S. Appl. No. 14/512,274—Non-final Office Action dated Nov. 3, 2017, 27 pages.

(56) References Cited

OTHER PUBLICATIONS

U.S. Appl. No. 14/512,240—Response to Office Action dated Oct. 15, 2015 filed Jan. 16, 2016, 13 pages.
U.S. Appl. No. 15/229,024—Notice of Allowance dated Dec. 7, 2017, 9 pages.
U.S. Appl. No. 14/512,263—Office Action dated Nov. 6, 2017, 41 pages.
U.S. Appl. No. 14/512,267—Response to Non-final Office Action dated Sep. 1, 2017 filed Nov. 30, 2017, 25 pages.
PCT/US2017/057471—International Search Report and Written Opinion dated Jan. 15, 2018, 16 pages.
U.S. Appl. No. 14/512,258—Notice of Allowance dated May 12, 2017, 15 pages.
Achuff, "Winter '16 is Coming Soon"Aug. 20, 2016, 3 pgs.
Salesforce, "Analyze Your Data", Dec. 17, 2015, 431pgs.
Salesforce, Wave Analytics Data Integration, Apr. 28, 2016, 131pgs.
Salesforce, "Wave analytics technical whitepape", 7pgs.
Salesforce,"Winter '16 Release", Dec. 30, 2015, 506pgs.
Davis, Chris, Graphite Documentation Release 0.10.0, Sep. 16, 2014, 135 pgs.
GitHub exbz Description of Graphite UI, 2014, 13 pgs. [Retrieved Sep. 16, 2014 3:06:56 PM], Retrieved from Internet: <https://github.com/ezbz/graphitus>.
ExactTarget, "The Future of Marketing Starts Here", Mar. 1, 2013, [retreived Mar. 1, 2013], Retreived from Internet <http://www.exacttarget.com>, http://web.archive.org/web/20130301133331/http://www.exacttarget.com/.
Agrawala, Maneesh, "Animated Transitions in Statistical Data Graphics", 3 pgs, Sep. 22, 2009, [Retrieved Sep. 12, 2014 9:00:30 AM] Retrieved from Internet <https://www.youtube.com/watch?v=vLk7mlAtEXI&feature=youtu.be>.
Segel, Edward et al. "Narrative Visualization: Telling Stories with Data", Mar. 31, 2010, http://vis.stanford.edu/papers/narrative, 10 pgs.
Heer, Jeffrey, et al., "Animated Transitions in Statisical Data Graphics", Mar. 31, 2007, 10 pgs.
Demiralp, C., et al., "Visual Embedding, a Model for Visualization", Visualization Viewpoints, IEEE Computer Graphics and Applications, Jan./Feb. 2014, p. 6-11.
Stanford Vis group / Papers, "Visualization Papers, 2014-2001", retrieved from http://vis.stanford.edu/papers on Sep. 12, 2014, 9 pages.
U.S. Appl. No. 14/512,258—U.S. Non-provisional Application titled "Visual Data Analysis with Animated Informaiton al Morphing Replay", inventors: Didier Prophete and Vijay Chakravarthy, filed Oct. 10, 2014, 56 pages.
U.S. Appl. No. 14/512,230—"Row-Level Security Integration of Analytical Data Store with Cloud Architecture", inventors Donovan Schneider et al., filed Oct. 10, 2014, 39 pages.
U.S. Appl. No. 14/512,240—"Low Latency Architecture with Directory Service for Integration of Transactional Data System with Analytical Data Structures", inventors: Donovan Schneider et al., filed Oct. 10, 2014, 35 pages.
U.S. Appl. No. 14/512,249—"Integration User for Analytical Access to Read Only Data Stores Generated from Transactional Systems", inventors Donovan Schneider, et al., filed Oct. 10, 2014, 35 pages.
U.S. Appl. No. 14/512,263—"Declarative Specification of Visualization Queries, Display Formats and Bindings", inventors Didier Prophete et al., filed Oct. 10, 2014, 58 pages.
U.S. Appl. No. 14/512,267—"Dashboard Builder with Live Data Updating Without Exiting an Edit Mode", Inventors: Didier Prophete et al., filed Oct. 10, 2014, 55 pages.
"Occasionally Connected Applications (Local Database Caching)", downloaded on Sep. 11, 2014, from http://msdn.microsoft.com/en-us/library/vstudio/bb384436(v=vs.100).aspx, 3 pages.
U.S. Appl. No. 14/512,274—"Offloading Search Processing Against Analytic Data Stores", Inventors Fred Im et al., filed Oct. 10, 2014, 40 pages.
Dumas et al., "Stuff I've Seen: A System for Personal Information Retrieval and Re-Use," SIGIR '03 (2003), Available at: ACM, pp. 8.
Pedersen et al, "Query Optimization for OLAP-XML Federations" ACM, Nov. 8, 2002, pp. 57-64.
Rao et al, "Spatial Hierarchy and OLAP-Favored Search in Spatial Data Warehouse", ACM, New Orleans, LA., Nov. 7, 2003, pp. 48-55.
U.S. Appl. No. 14/512,240—Office Action dated Oct. 15, 2015, 17 pages.
U.S. Appl. No. 14/512,240—Notice of Allowance dated Mar. 16, 2016, 10 pages.
U.S. Appl. No. 14/512,249—Office Action dated Dec. 18, 2015, 15 pages.
U.S. Appl. No. 14/512,249—Response to Office Action dated Dec. 18, 2015, filed Apr. 18, 2016, 10 pages.
U.S. Appl. No. 14/512,249—Notice of Allowance dated May 11, 2016, 14 pages.
Salesforce.com, "SOAP API Developer's Guide" <https://resources.docs.salesforce.com/200/latest/en-us/sfdc/pdf/apen_api.pdf>, 2244 pages, May 5, 2016.
Salesforce.com, "Row-Level Security for Datasets", <https://help.salesforce.com/apex/HTViewHelpDoc?id=bi_security_datasets_row_level_htm> version prior to Oct. 10, 2013.
Salesforce.com, "Salesforce Security Guide" <http://resources.docs.salesforce.com/2007/17/en-us/sfdc/pdf/ salesforce_security_impl_guide_pdf> version prior to Oct. 10, 2013.
U.S. Appl. No. 14/512,230—Office Action dated Apr. 27, 2016, 8 pages.
RLS Core Predicate Template, about Jun. 2014, 2 pages.
Security Implementation Guide, salesforce.com, inc., version 28, Aug. 30, 2013, 112 pages.
U.S. Appl. No. 14/512,230—Notice of Allowance dated Nov. 8, 2016, 21 pages.
U.S. Appl. No. 14/512,267—Office Action dated Sep. 21, 2016, 29 pages.
SOAP API Developers Guide, salesforce.com, inc., version 28, Aug. 23, 2013, 1344 pages.
EdgeSpring Legacy Content, about 2012, 97 pages.
Salesforce.com, "Salesforce Analytics Cloud Implementation and Data Integration Guide" <https://jijra.talendforge.org/secure/attachment/74327/Analytics%20Cloud%20Implementation%20Guide.pdf>, Sep. 23, 2014.
U.S. Appl. No. 14/512,274—Office Action dated Jan. 13, 2017, 24 pages.
U.S. Appl. No. 14/598,157—Office Action dated Jan. 30, 2017, 78 pages.
Shimada et al, "Proposing A New Task Model towards Many-Core Architecture", ACM, pp. 45-48, 2013.
Pu, "Modeling, Querying and Reasoning about OLAP Databases: A Functional Approach",ACM, pp. 1-8, 2005.
Papadakis et al, "A System to Measure, Control and Minimize End-To-End Head Tracking Latency in Immersive Simulations", ACM, pp. 581-584, 2011.
Wang et al, "Efficient Task Replication for Fast Response Time in Parallel Computation", ACM, pp. 599-600, 2014.
U.S. Appl. No. 14/512,258—Office Action dated Sep. 9, 2016, 22 pages.
U.S. Appl. No. 14/512,258—Response to Office Action dated Sep. 9, 2016, filed Jan. 9, 2017, 11 pages.
U.S. Appl. No. 14/512,263—Office Action dated Feb. 13, 2017, 29 pages.
U.S. Appl. No. 14/512,267—Response to Office Action dated Sep. 21, 2016, filed Jan. 23, 2017, 14 pages.

* cited by examiner

FIG. 7

STREAMLINED CREATION AND UPDATING OF OLAP ANALYTIC DATABASES

CROSS REFERENCE TO OTHER APPLICATIONS

This application claims priority to U.S. Provisional Patent Application No. 62/410,313, entitled "OBJECT REPLICATION", filed on Oct. 19, 2016. The priority provisional application is hereby incorporated by reference;

This application incorporates by reference U.S. Nonprovisional patent application Ser. No. 14/512,230, entitled "ROW-LEVEL SECURITY INTEGRATION OF ANALYTICAL DATA STORE WITH CLOUD ARCHITECTURE", filed on Oct. 10, 2014;

This application incorporates by reference U.S. Nonprovisional patent application Ser. No. 14/598,157, entitled "DEEP LINKING AND STATE PRESERVATION VIA A URL", filed on Jan. 15, 2015;

This application incorporates by reference U.S. Nonprovisional patent application Ser. No. 14/512,240, entitled "LOW LATENCY ARCHITECTURE WITH DIRECTORY SERVICE FOR INTEGRATION OF TRANSACTIONAL DATA SYSTEM WITH ANALYTICAL DATA STRUCTURES", filed on Oct. 10, 2014;

This application incorporates by reference U.S. Nonprovisional patent application Ser. No. 14/512,249, entitled "INTEGRATION USER FOR ANALYTICAL ACCESS TO READ ONLY DATA STORES GENERATED FROM TRANSACTIONAL SYSTEMS", filed on Oct. 10, 2014 (now U.S. Pat. No. 9,449,188 issued on Sep. 20, 2016);

This application incorporates by reference U.S. Nonprovisional patent application Ser. No. 14/512,258, entitled "VISUAL DATA ANALYSIS WITH ANIMATED INFORMATION MORPHING REPLAY", filed on Oct. 10, 2014;

This application incorporates by reference U.S. Nonprovisional patent application Ser. No. 14/512,263, entitled "DECLARATIVE SPECIFICATION OF VISUALIZATION QUERIES DISPLAY FORMATS AND BINDINGS", filed on Oct. 10, 2014;

This application incorporates by reference U.S. Nonprovisional patent application Ser. No. 14/512,267, entitled "DASHBOARD BUILDER WITH LIVE DATA UPDATING WITHOUT EXITING AN EDIT MODE", filed on Oct. 10, 2014; and This application incorporates by reference U.S. Nonprovisional patent application Ser. No. 14/512,274, entitled "OFFLOADING SEARCH PROCESSING AGAINST ANALYTIC DATA STORES", filed on Oct. 10, 2014.

FIELD OF THE TECHNOLOGY DISCLOSED

The technology disclosed relates generally to data processing apparatus and corresponding methods for the retrieval of data stored in a database or as computer files, and in particular relates to efficiently and transparently creating and frequently updating multiple online analytic processing (OLAP) analytic databases from an online transaction processing (OLTP) transaction updatable system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Organizations are generating and accessing vast amount of data, more than ever before, coming from a multitude of sources: log data, location data, behavioral data, sensor data. This flood of data is not only voluminous but comes in many forms, from unstructured to structured and every variation in between. Hence, organizations have an unprecedented opportunity to learn more about their businesses, markets, and customers from the explosion of data being generated from a wealth of sources—from sensors to apps, software to websites. The need to explore, analyze, and gain insights from this data has never been more pressing. With legacy business intelligence and analytics tools, the underlying technology is based on structured, relational databases. Relational databases lack the agility, speed, and true insights necessary to transform data into value.

A number of emerging solutions in recent years have attempted to address the challenges outlined above. Many of them, however, have continued to rely at least partially on the same architecture and technology approach that have caused the challenges in the first place. For example, one solution that has emerged is the use of columnar or in-memory databases, adopted by BI vendors over the past decade. While they moved the needle forward, they were still hampered by the relational model and its associated limitations.

Therefore, an opportunity arises to enable users to explore data in a fast, efficient, self-service, agile way—without dependency on data scientists, cumbersome data warehouse schemas, and slow, resource-intensive IT infrastructure.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 7 depicts one implementation of a build interface used to identify fields of an object to be extracted in advance by a global extraction job.

DETAILED DESCRIPTION

Figure 1:
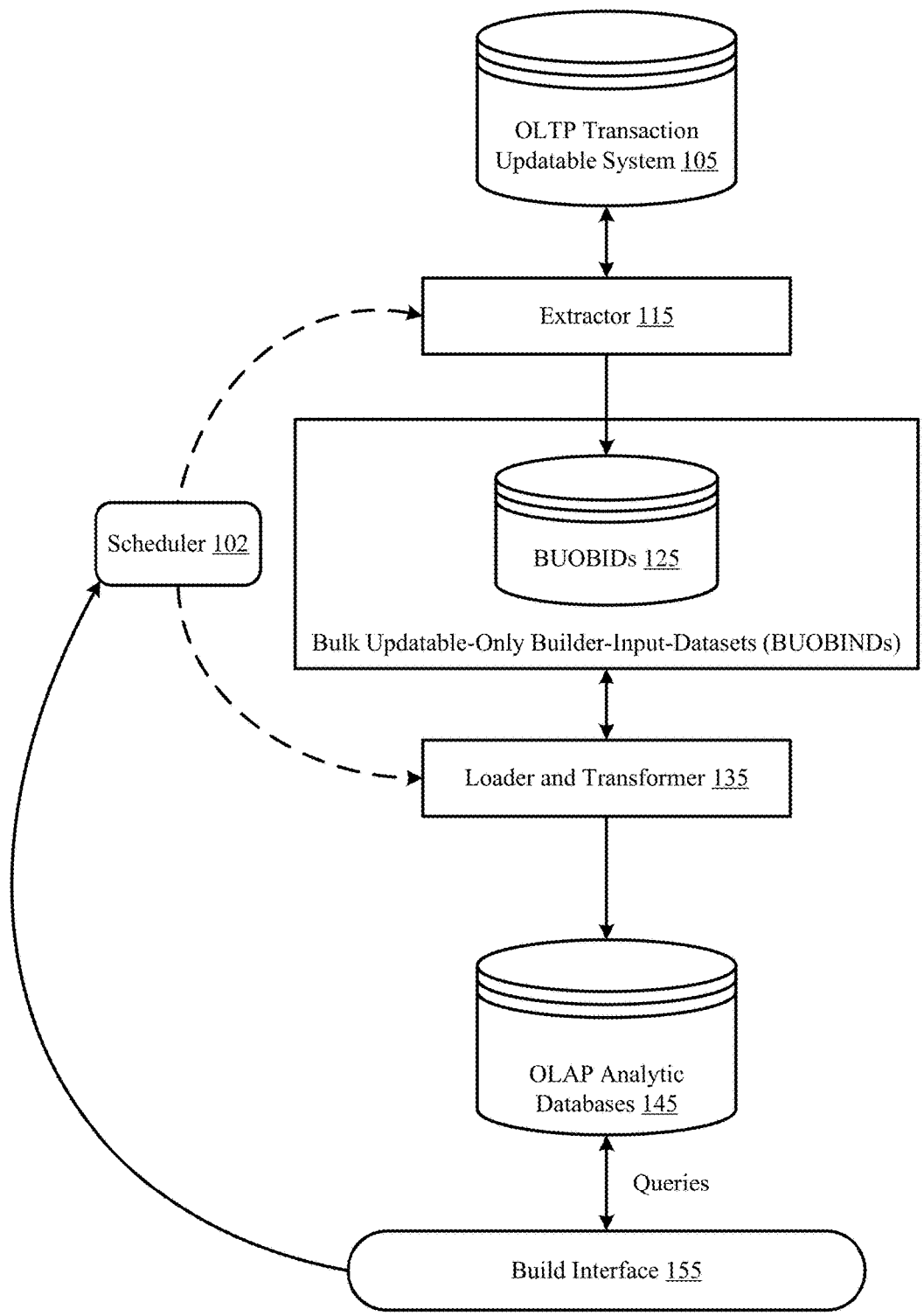
FIG. 1 shows a high-level overview of a system that implements a decoupled extract, load, and transform (ELT) process in accordance with one implementation of the technology disclosed.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Wave Analytics Platform™ (hereinafter "Wave") from Salesforce.com™ (hereinafter "Salesforce") has revolutionized business intelligence technology by taking an innovative approach to analytics, one that combines a non-relational approach to heterogeneous data forms and types with a search-based query engine, advanced compression algorithms, columnar in-memory computing, and high-speed visualization engine. For additional information regarding various features and implementations of Wave, reference can be made to, for example, commonly owned U.S. patent application Ser. Nos. 14/512,230; 14/598,157; 14/512,240; 14/512,249; 14/512,258; 14/512,263; 14/512,267; and 14/512,274, which are incorporated by reference for all purposes as if fully set forth herein.

The traditional way of designing a data warehouse is a waterfall approach to gather requirements, figure out relationships, pre-determine the data structure, scrub the data set, add a semantic layer to the data—and finally to ingest the data. Depending on the size and complexity of the dataset, the process can take many months to complete. Wave reverses this process. It treats data ingestion not as an exercise in "extract, transform, and load" (or ETL, the traditional way of ingesting data into a database), but as ELT—data is extracted, loaded, indexed, and made available immediately for analysis or additional transformations.

In Wave, an extraction engine extracts data from an online transaction processing (OLTP) transaction updatable system, which includes transaction commit, rollback, and field level security capabilities. The extracted data is loaded into in-memory columnar stores by a loading engine, with a dynamic, horizontally scalable non-relational key-value pair approach. Unlike traditional relational databases, key-value pairs only store non-empty data values, which, in the case of really sparse data, add to data storage efficiency and speed.

Then, a transformation engine applies small, inline transformations to the ingested data, including pruning, filtering, partitioning, and augmenting. The transformed data is stored in highly optimized online analytic processing (OLAP) analytic databases, which use techniques such as differential encoding, vector encoding, and incremental encoding to compress data. The heavy compression allows the OLAP analytic databases to have a significantly smaller size than the original source data in the OLTP transaction updatable system—at compression ratios that can exceed 90%.

Wave optimizes the query process by responding to queries from the in-memory columnar OLAP analytic databases, rather than from the rows and tables of the on-disk OLTP transaction updatable system. With relational databases, a query on a large dataset requires the analytics engine to process each value in each row of a very large set of data. By avoiding processing of rows of data and reading of columns not related to a query, Wave is able to execute sub-second and highly efficient queries on extremely large datasets.

In addition, Wave accesses the OLAP analytic databases using an inverted index, permitting variable numbers of dimensions and attributes for data and the accommodation of text strings and unstructured data, as well as datasets with variable levels of completeness or characterization. With the inverted index, Wave permits OLAP analytic databases equivalent to up to a billion rows in the OLTP transaction updatable system to be queried in seconds.

In sum, the benefit is that database administrators gain rapid access to OLAP analytic databases, and can immediately determine in what ways the data is relevant to their needs—without weeks or months of investment in "cleaning up" data before exploring it.

Wave also features a self-service portal with a build interface, which allows database administrators to provision their own datasets from the OLAP analytic databases and then to create analytic applications that use those datasets. A dataset contains a set of source data, stored in the OLAP analytic databases in a specially formatted, denormalized, highly compressed, and optimized manner for interactive exploration. Datasets are provisioned using OLAP dataflow build specifications, which are a set of instructions that specifies what data to extract from the OLTP transaction updatable system, how to load and transform the datasets, and which datasets to make available for querying. In implementations, an OLAP dataflow build specification is a JSON file that contains definitions that represent the OLAP dataflow logic. An OLAP dataflow job processes the logic in a given OLAP dataflow build specification to create a dataset from the OLAP analytic databases.

The technology disclosed in this application builds on Salesforce's Wave Analytics Platform™ by providing systems and methods that make it faster and efficient to bring data from the OLTP transaction updatable system to the OLAP analytic databases. For an organization, the technology disclosed decouples the extract of data from the OLTP transaction updatable system from the execution of the OLAP dataflow jobs configured by the organization for creation of datasets from the OLAP analytic databases.

The technology disclosed implements a global extraction process that extracts data from the OLTP transaction updatable system in advance and independent of the configured OLAP dataflow jobs, and makes the extracted data available for the execution of the dataflow jobs. With the extraction process scheduled ahead of time, the OLAP dataflow jobs have less to do and run faster.

Without the technology disclosed, Wave performs a separate extract for each configured OLAP dataflow job. With the technology disclosed, a global extraction occurs ahead of time and dataset provisioning from the OLAP analytic databases happens faster because it no longer includes extraction of data from the OLTP transaction updatable system—just loading and transformation.

To make the OLAP dataflow jobs even more efficient, the technology disclosed extracts data from the OLTP transaction updatable system incrementally, meaning that just the data which has changed since a prior extraction gets extracted. Records are inserted, updated, or deleted to match changes in the objects since the previous extraction run. This way, incremental extraction decreases the time required to extract the data from the OLTP transaction updatable system.

The technology disclosed uses the data extracted from the OLTP transaction updatable system in advance to build intermediate, locally cached datasets called bulk updatable-only builder-input-datasets (BUOBIDs). Once created, the BUOBIDs are responsive to the OLAP dataflow jobs in dependence upon loading and transformation instructions identified in respective OLAP dataflow build specifications. When the OLAP dataflow jobs are executed on the BUOBIDs, the OLAP analytic databases and comprising datasets are efficiently built from the locally cached BUOBIDs, without transmission of any data across the network from the OLTP transaction updatable system. In some implementations, to further improve efficiency, larger OLAP dataflow jobs are broken into smaller chunks that are executed on the BUOBIDs in parallel.

In one implementation, for an organization, the technology disclosed evaluates the OLAP dataflow build specifications of scheduled OLAP dataflow jobs to identify which objects and fields are required to satisfy the organization's extraction needs. Using this information, the technology disclosed automatically schedules independent extraction of the objects and fields using the global extraction job and provides them in advance as locally cached BUOBIDs. If the OLAP dataflow build specifications are later updated (e.g., objects and/or fields are deleted and/or added from the OLAP dataflow build specifications), or new OLAP dataflow build specifications are created, the technology disclosed automatically modifies the global extraction job with relevant changes and in turn updates the BUOBIDs.

Figure 4:
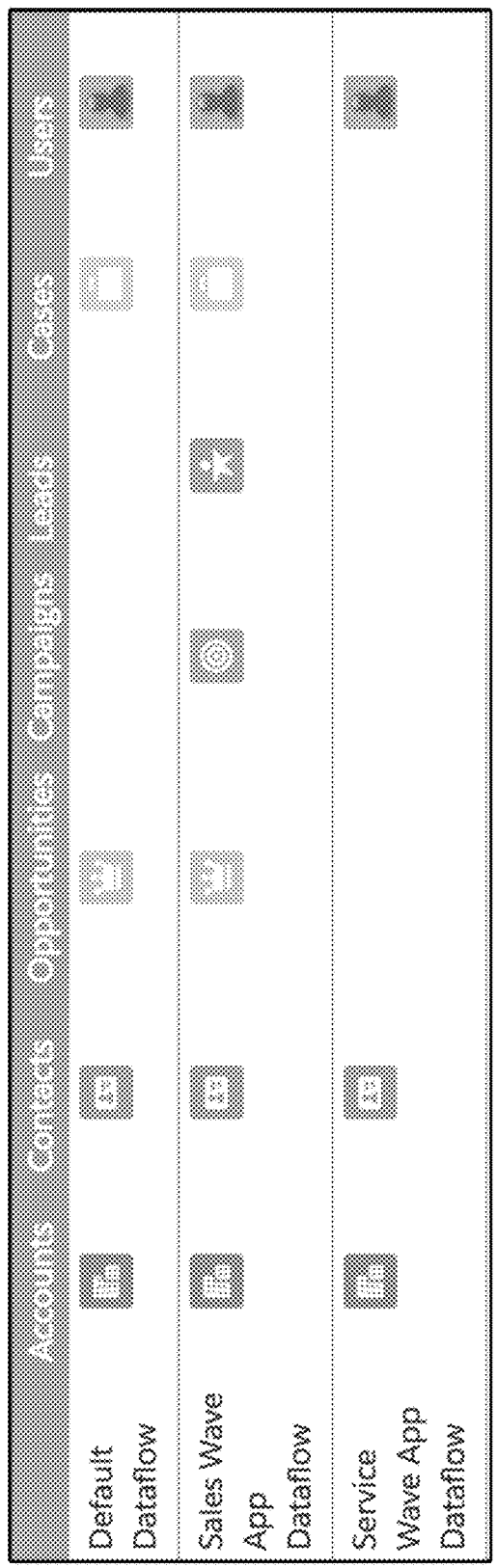
FIG. 4 is an example of multiple OLAP dataflow jobs scheduled by an organization.

Consider the example 400 shown in FIG. 4, where an organization has scheduled three OLAP dataflow jobs in Wave, namely "default dataflow, "sales wave app dataflow", and "service wave app dataflow". Each of the three dataflow jobs is configured to extract, from the OLTP transaction updatable system, a combination of some of the following objects: accounts, contacts, opportunities, campaigns, leads, cases, and users. Note that objects like accounts, contacts, opportunities, cases, and users are identified for extraction in at least two of the three dataflow jobs.

Figure 5:
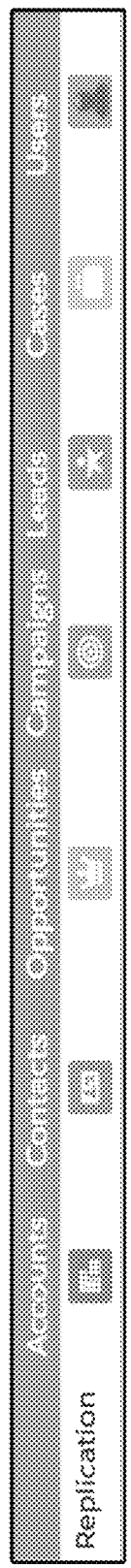
FIG. 5 shows objects and fields identified in the OLAP dataflow jobs of FIG. 4 being extracted in advance by a global extraction job.

If these OLAP dataflow jobs were to run without the technology disclosed, they would individually extract their respective set of objects from the OLTP transaction updatable system. The more objects and fields there are, the longer the dataflow jobs take to run. Furthermore, as noted above, the dataflow jobs are duplicating efforts by performing separate extracts from the same object. For instance, accounts data is extracted by all three dataflow jobs. With the technology disclosed, as shown in FIG. 5, all of the extracts are performed automatically and incrementally as a separate and global extract process 500, which is scheduled to take place before the load and transform operations of the OLAP dataflow jobs are run. The extracted data is then made available to all the scheduled OLAP dataflow jobs, in the form of locally cached BUOBIDs, for different loading and transformation operations that build the OLAP analytic databases. Also, the overall efficiency is improved because the OLTP transaction updatable system is not redundantly accessed for the same object data.

In one implementation, an organization can manually schedule the global extraction job to complete before the OLAP dataflow jobs start to ensure that the BUOBIDs are available to the OLAP dataflow jobs. In one implementation, the organization can set them to run on the same hourly interval, but start at different times. For example, the organization can schedule them to run every six hours, but set the minute offset to 0 for the global extraction job and 55 for the OLAP dataflow jobs.

In some implementations, the objects and fields to be incrementally extracted in advance by the global extraction job are identified by a database administrator via a build interface. The objects and fields selected from the build interface are then incorporated in one or more OLAP dataflow build specifications. Once identified via the build interface, dependencies among the objects and fields are resolved and merged. After that, the global extraction job extracts the objects and fields from the OLTP transaction updatable system and makes them locally available ahead of time, in the form of BUOBIDs, for the loading and transformation operations of the scheduled OLAP dataflow jobs that create the OLAP analytic databases.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

As used herein, "concurrently" or "in parallel" does not require exact simultaneity. It is sufficient if the execution of one of the OLAP dataflow jobs begins before the execution of another of the OLAP dataflow jobs completes.

With an introduction describing some of the implementations of the technology disclosed presented, the discussion now turns to a high-level overview of the system.

Decoupled-ELT System

FIG. 1 shows a high-level overview of a system 100 that implements a decoupled extract, load, and transform (ELT) process in accordance with one implementation of the technology disclosed. System 100 includes an online transaction processing (OLTP) transaction updatable system 105, which has transaction commit, rollback, and field level security capabilities. In one implementation, the OLTP transaction updatable system 105 is a multi-tenant database system in which various elements of hardware and software of the database system can be shared by one or more users. For example, a given application server can concurrently process requests for a great number of users, and a given database table can store rows for a potentially much greater number of users. In implementations, the OLTP transaction updatable system 105 can include any number of custom and/or standard objects and fields. As used herein, "custom" should be understood as meaning that a respective object or field is tenant-specific (e.g., only available to users associated with a particular tenant in the multi-tenant system) or user-specific (e.g., only available to a particular subset of users within the multi-tenant system), whereas "standard" or "universal" objects or fields are available across multiple tenants in the multi-tenant system.

In other implementations, the OLTP transaction updatable system 105 is a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational columnar key-value database implementation, a BigTable™ compatible non-relational database implementation, or an HBase™ or DynamoDB™ compatible non-relational database implementation. In addition, the OLTP transaction updatable system 105 can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™. Other implementations of the technology disclosed include data sources (e.g., external systems) in addition to, instead of, or different from the OLTP transaction updatable system 105.

System 100 also includes a scheduler 102, an extractor 115, and a loader and transformer 135, which can be engines of varying types, including a workstation, server, computing cluster, blade server, server farm, or any other data processing system or computing device. The engines can be communicably coupled to the databases via different network connections. For example, the scheduler 102 can be coupled via the Internet, the extractor 115 can be coupled via a direct network link, and the loader and transformer 135 can be coupled by yet a different network connection. System 100 further includes multiple bulk updatable-only builder-input-datasets (BUOBIDs) 125, multiple online analytic processing (OLAP) analytic databases 145, and a build interface 155.

The interconnection of the elements of the system 100 is now described. A network couples the OLTP transaction updatable system 105, the scheduler 102, the extractor 115, the loader and transformer 135, the BUOBIDs 125, the OLAP analytic databases 145, and the build interface 155 in communication. The actual communication path can be point-to-point over public and/or private networks. All of the communications can occur over a variety of networks, e.g. private networks, VPN, MPLS circuit, or Internet, and can use appropriate APIs and data interchange formats, e.g., REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

During operation, the scheduler 102 implements an extraction schedule and a rebuild schedule that decouple the extractor 115 from the loader and transformer 135 such that the extractor 115 executes a global extraction process that extracts data from the OLTP transaction updatable system 105 in advance and independent of the loader and transformer 135 creating and updating the OLAP analytic databases 145. Following the extraction schedule, the extractor 115 incrementally replicates database objects and fields updated since a prior extraction, from the OLTP transaction updatable system 105, to the locally cached BUOBIDs 125.

Multiple OLAP analytic databases 145 are built from the locally cached BUOBIDs 125 that are made available to the loader and transformer 135. Following the rebuild schedule, the loader and transformer 135 periodically updates the OLAP analytic databases 145 from respective subset combinations of the BUOBIDs 125 using a separate load process. The separate load process is based on respective OLAP dataflow build specifications executed by OLAP dataflow jobs.

The build interface 155 is used to query the OLAP analytic databases 145 for datasets. It is also used to add new objects and/or fields and/or remove pre-existing objects and/or fields from the global extraction job implemented in advance by the extractor 115. It is also used to configure the extraction schedule and the rebuild schedule.

With the high-level overview of the system provided, the discussion now turns to some of the technical problems addressed by various implementations of the technology disclosed.

Proliferation of Coupled ELT Processes

Figure 2:
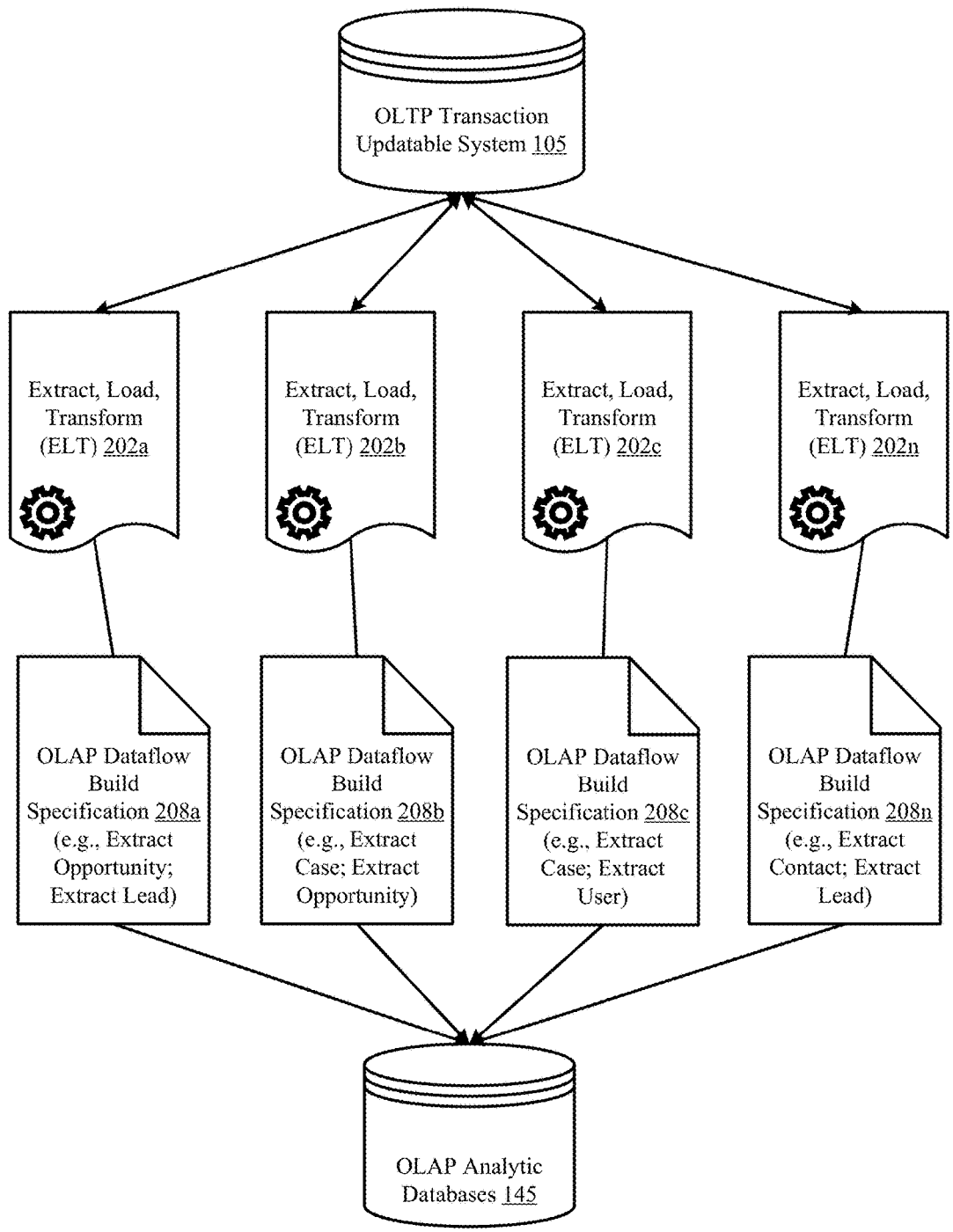
FIG. 2 illustrates proliferation of coupled ELT processes in Wave without the technology disclosed.

FIG. 2 illustrates proliferation 200 of coupled ELT processes 202*a-n* in Wave without the technology disclosed. Specifically, FIG. 2 shows multiple OLAP dataflow build specifications 208*a-n* configured by an organization. Each of the OLAP dataflow build specifications 208*a-n* identifies a set of objects that are to be extracted from the OLTP transaction updatable system 105. For instance, OLAP dataflow build specification 208*a* identifies opportunity and lead objects, OLAP dataflow build specification 208*b* identifies case and opportunity objects, OLAP dataflow build specification 208*c* identifies case and user objects, and OLAP dataflow build specification 208*n* identifies contact and lead objects. Note that certain objects (e.g., opportunity, lead, case) are redundantly identified in multiple OLAP dataflow build specifications for extraction.

Without the technology disclosed, the OLAP dataflow build specifications 208*a-n* are separately processed by individual ELT processes 202*a-n*. Since each extract process requires accessing the on-disk OLTP transaction updatable system 105, the proliferation 200 of dedicated extract processes for each OLAP dataflow build specifications introduces computational latency in OLAP dataflow jobs that process the OLAP dataflow build specifications. The problem is further exacerbated by duplicate extraction of objects redundantly identified in multiple OLAP dataflow build specifications. After the ELT processes 202*a-n* are applied on the on-disk OLTP transaction updatable system 105, the resulting datasets are stored in the OLAP analytic databases 145.

With some of the technical problems addressed by various implementations understood, the discussion now turns to more detailed architectures for implementing the system, together with the methods.

Creating and Frequently Updating OLAP Analytic Databases

Figure 3:
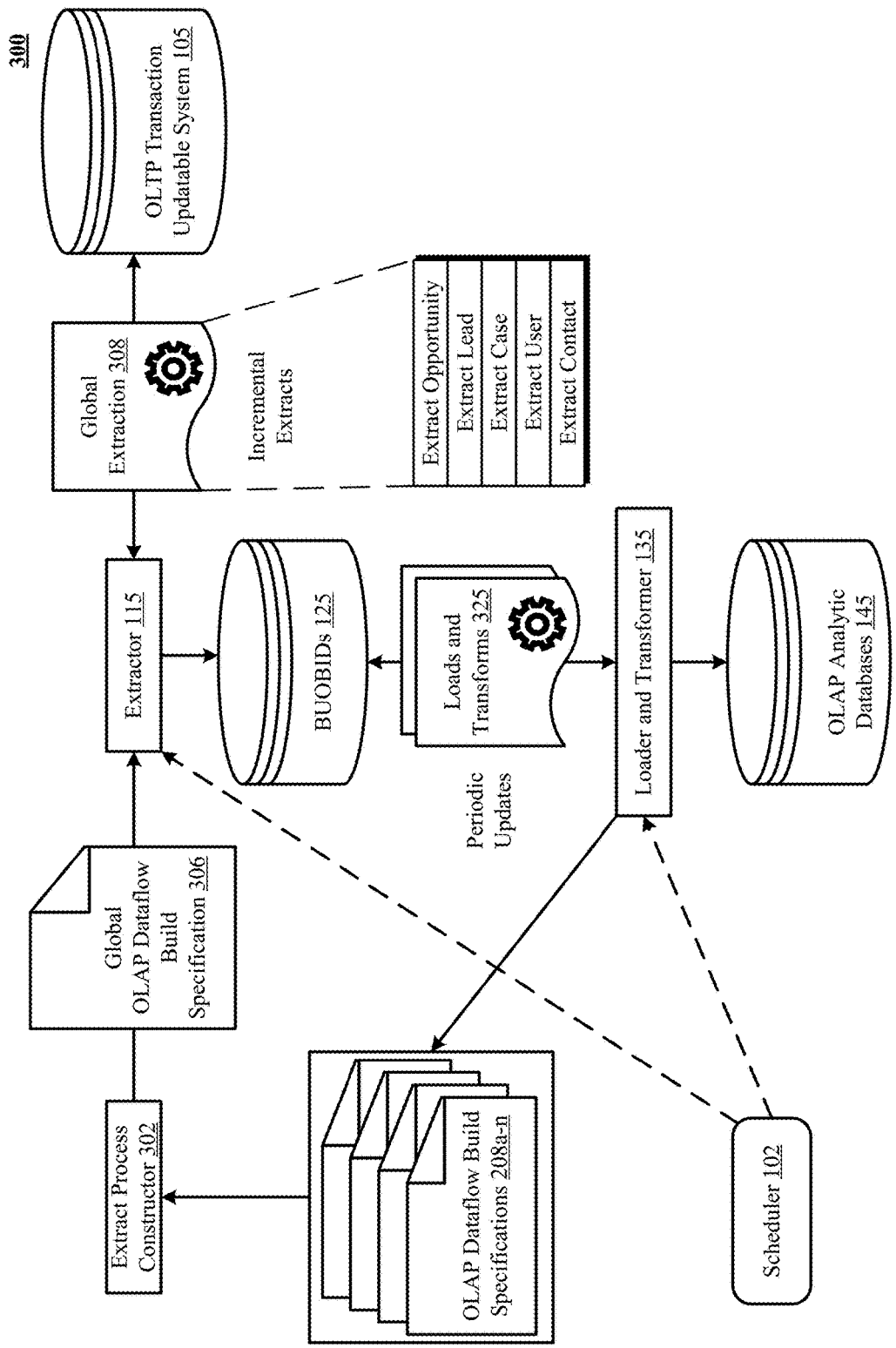
FIG. 3 depicts one implementation of creating and frequently updating multiple OLAP analytic databases from an OLTP transaction updatable system that includes transaction commit, rollback, and field level security capabilities.

FIG. 3 depicts one implementation of creating and frequently updating 300 multiple OLAP analytic databases 145 from the OLTP transaction updatable system 105 that includes transaction commit, rollback, and field level security capabilities. In FIG. 3, an extract process constructor 302 evaluates the OLAP dataflow build specifications 208a-n configured to be processed by an organization's existing scheduled OLAP dataflow jobs. Based on the evaluation, the constructor 302 identifies a set of objects and fields required to be extracted for the organization. Using the identified objects and fields, the constructor 302 generates a global dataflow build specification 306 that de-duplicates any redundant objects and includes just single instances of all the objects identified in the OLAP dataflow build specifications 208a-n.

Consider, for example, that the OLAP dataflow build specifications 208a-n identify the following object pairs respectively: opportunity, lead; case, opportunity; case, user; and contact, lead (as shown in FIG. 2). In one implementation, the global dataflow build specification 306 generated by the constructor 302 based on the OLAP dataflow build specifications 208a-n includes just the following de-duplicated objects: opportunity, lead, case, user, and contact.

The constructor 302 automatically detects any changes to existing OLAP dataflow build specifications 208a-n, addition of new OLAP dataflow build specifications, and/or removal of existing OLAP dataflow build specifications. In response, it automatically and periodically modifies the global dataflow build specification 306 so that the global dataflow build specification 306 accurately and comprehensively represents an organization's current OLAP dataflow build specifications without any redundancies.

The scheduler 102 ensures that the extractor 115 uses the global dataflow build specification 306 to implement a global extraction job 308 prior to the scheduled OLAP dataflow jobs requiring the objects and fields identified in their respective OLAP dataflow build specifications 208a-n. In one implementation, the global extraction job 308 uses a single extraction to incrementally extract or replicate data for all the objects and fields identified in the global dataflow build specification 306 (e.g., opportunity, lead, case, user, and contact). In some implementations, the incremental replication just includes objects and fields that have been updated since a prior global extraction job. Thus, in some implementations, a first, earliest, or reset global extraction job includes full extraction of all the objects and fields identified in the global dataflow build specification 306.

Accordingly, in response to changes with respect to the OLAP dataflow build specifications and/or in response to changes with respect to the objects and fields in the OLTP transaction updatable system 105, the global extraction job 308 is automatically, periodically, and incrementally performed in parallel over multiple objects of the OLTP transaction updatable system 105.

The globally extracted data is then replicated to the BUOBIDs 125, which serve as locally caches in some implementations. In one implementation, the BUOBIDs 125 are stored in an in-memory columnar store. The scheduler 102 then causes the loader and transformer 135 to use the BUOBIDs 125 for executing the scheduled OLAP dataflow jobs in dependence upon their respective OLAP dataflow build specifications 208a-n. Note that even though the BUOBIDs 125 include data extracted in advance for multiple OLAP dataflow build specifications 208a-n, the loader and transformer 135 performs separate load and transform operations 325 customized for each individual OLAP dataflow build specification.

Continuing the example of the OLAP dataflow build specifications 208a-n, even though the BUOBIDs 125 include data extracted for opportunity, lead, case, user, and contact objects, the loader and transformer 135 evaluates each of the OLAP dataflow build specifications 208a-n individually and builds and rebuilds the multiple analytic databases 145 by periodically processing subset combinations of objects in the BUOBIDs 125 over separate load and transform operations 325.

Accordingly, the computational latency caused by the coupled ELT processes 202a-n is eliminated because multiple OLAP dataflow jobs are processed by a decoupled global extraction job that makes proactively and locally available, the data and data incrementals, required to periodically build and rebuild the multiple analytic databases 145.

The discussion now turns to the build interface implementation of the technology disclosed.

Build Interface

In some implementations of the technology disclosed, the OLAP dataflow build specifications 208a-n and 812a-n and/or the global OLAP dataflow build specifications 306 and 815, or equivalent thereof, are created via a build interface that accepts selection of visual elements representing the objects and fields in the OLTP transaction updatable system 105 for incremental replication of the represented objects and fields by a global extraction job.

Figure 6:
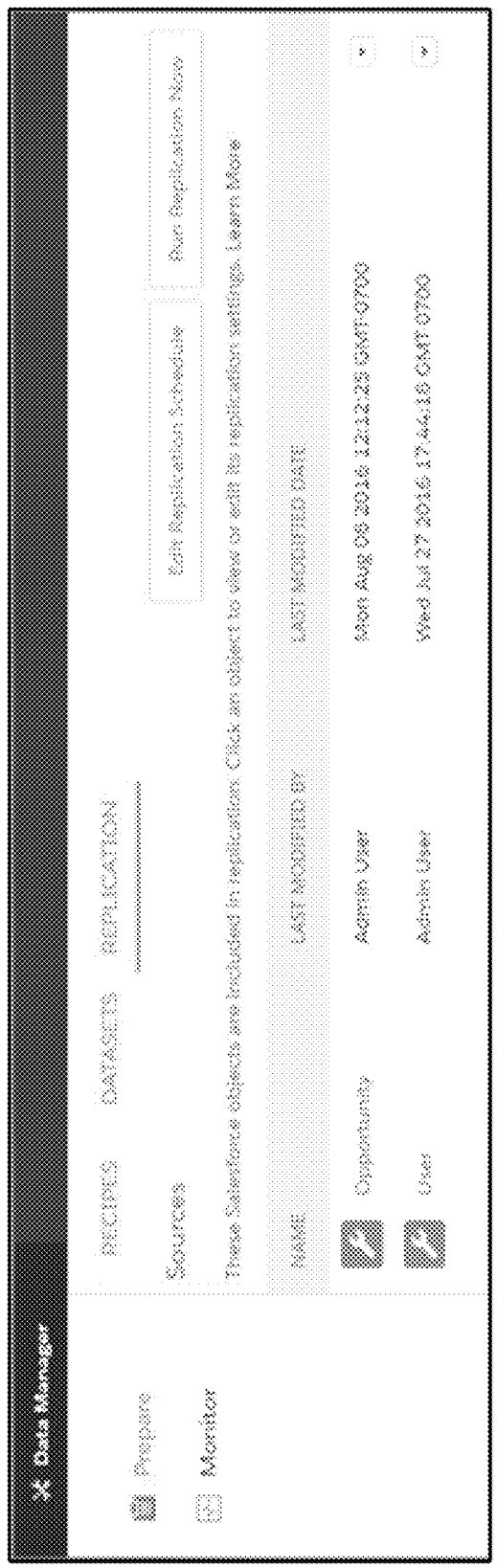
FIG. 6 is one implementation of a build interface used to identify objects to be extracted in advance by a global extraction job.

FIG. 6 is one implementation of a build interface 600 used to identify objects to be extracted in advance by a global extraction job. In the example shown in FIG. 6, a database administrator selects visual elements of the build interface 600 that represent database objects (e.g., opportunity, user) of the OLTP transaction updatable system 105. In one implementation, the database objects selected by the database administrator have not been yet extracted from the OLTP transaction updatable system 105 and/or yet identified in an existing OLAP dataflow build specification. In another implementation, the database objects selected by the database administrator have been extracted from the OLTP transaction updatable system 105 and/or identified in an existing OLAP dataflow build specification, but they have not been yet updated by a global extraction job to reflect their most recent values.

In one implementation, based on the selection of the visual elements representing database objects of the OLTP transaction updatable system 105, corresponding programmable code is generated (e.g., a JSON definition file). In some implementations, the programmable code serves as an OLAP dataflow build specification that is eventually used to implement a global extraction job. In another implementation, manipulation of the object-visual elements causes modifications to the corresponding programmable code, and in turn changes to the ultimate global extraction job and the data incrementally replicated to the BUOBIDs 125.

Figure 7:
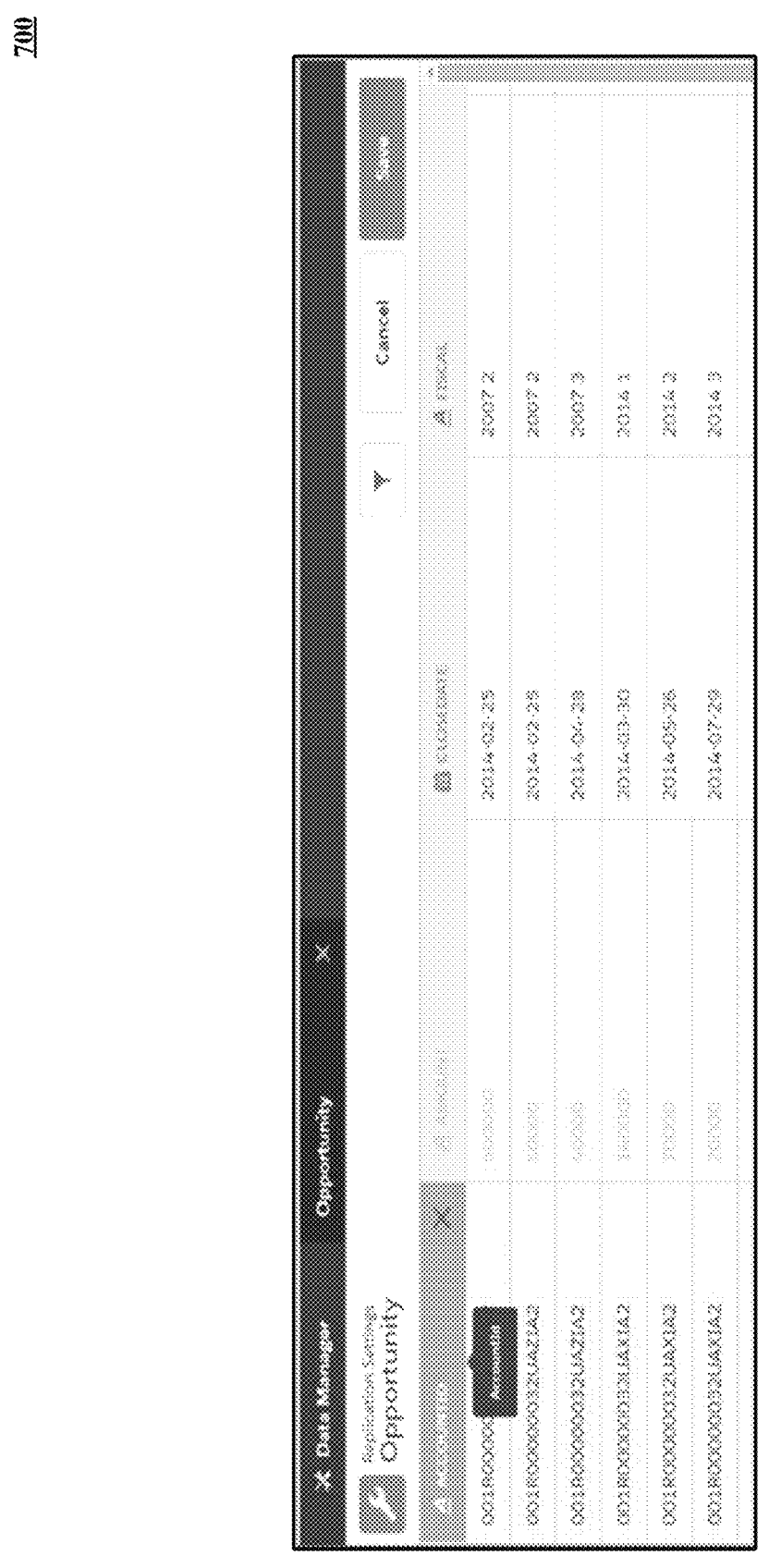

FIG. 7 depicts one implementation of a build interface 700 used to identify fields of an object to be extracted in advance by a global extraction job. In the example shown in FIG. 7, a database administrator selects visual elements of the build interface 700 that represent database fields (e.g., accountID, amount, close date, fiscal year) of an object (e.g., opportunity) of the OLTP transaction updatable system 105. In one implementation, the database fields selected by the database administrator have not been yet extracted from the OLTP transaction updatable system 105 and/or yet identified in an existing OLAP dataflow build specification. In another implementation, the database fields selected by the database administrator have been extracted from the OLTP transaction updatable system 105 and/or identified in an existing OLAP dataflow build specification, but they have not been yet updated by a global extraction job to reflect their most recent values.

In one implementation, based on the selection of the visual elements representing database fields of the OLTP transaction updatable system 105, corresponding programmable code is generated (e.g., a JSON definition file). In some implementations, the programmable code serves as an OLAP dataflow build specification that is eventually used to implement a global extraction job. In another implementation, manipulation of the field-visual elements causes modifications to the corresponding programmable code, and in turn changes to the ultimate global extraction job and the data incrementally replicated to the BUOBIDs 125.

The discussion now turns to the transparent decoupling implementation of the technology disclosed.

Transparent Decoupling

Figure 8:
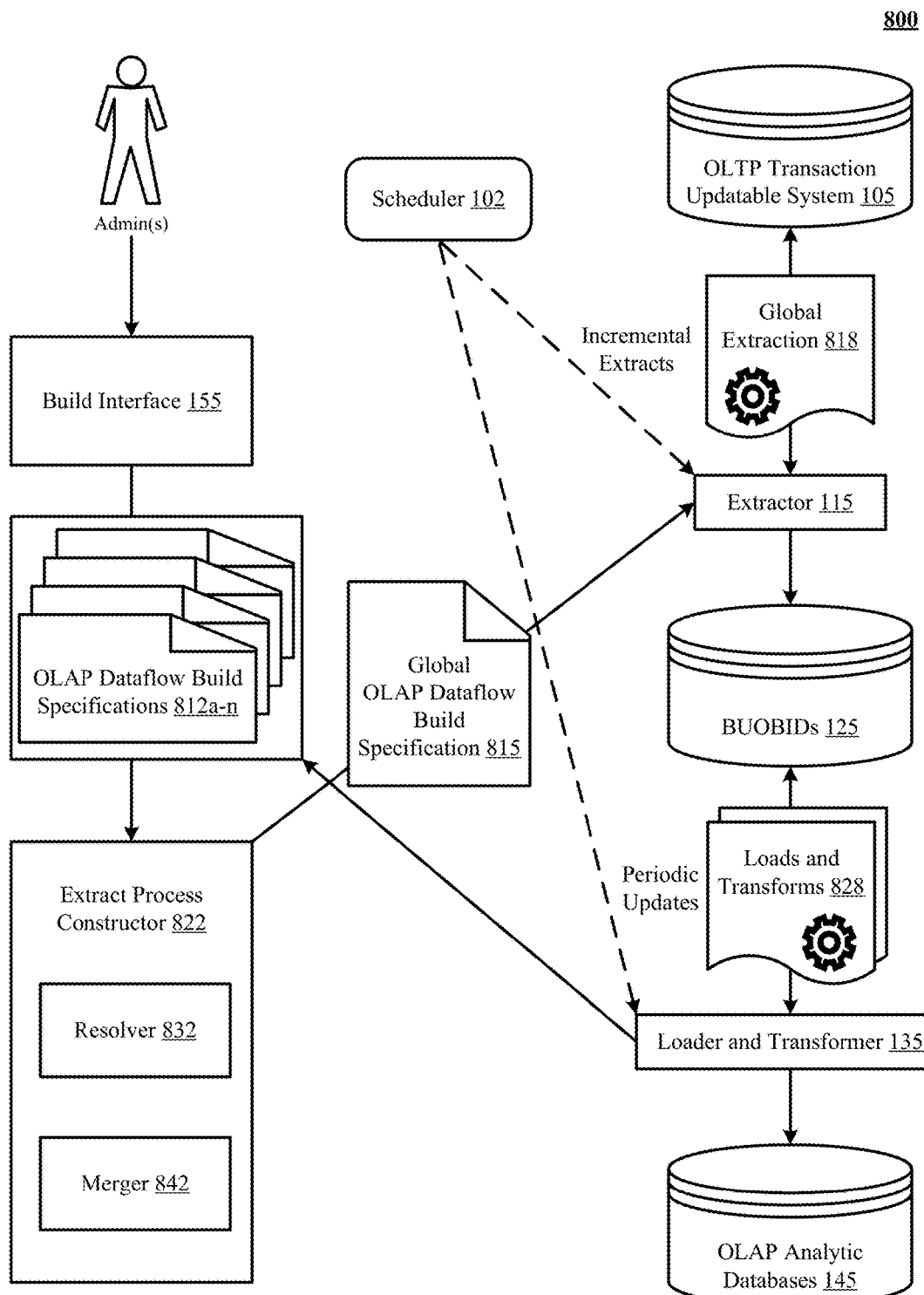
FIG. 8 illustrates one implementation of transparently decoupling extraction from rebuilding of frequently updated multiple OLAP analytic databases from an OLTP transaction updatable system that includes transaction commit, rollback, and field level security capabilities.

FIG. 8 illustrates one implementation of transparently decoupling 800 extraction from rebuilding of frequently updated multiple OLAP analytic databases 145 from the OLTP transaction updatable system 105 that includes transaction commit, rollback, and field level security capabilities. In FIG. 8, a database administrator accesses the build interface 155 to identify database objects and fields in the OLTP transaction updatable system 105 for building the OLAP analytic databases 145. In one implementation, the objects and fields selected via the build interface 155 can be defined as and/or included in one or more OLAP dataflow build specifications 812a-n.

In another implementation, an extract process constructor 822 uses a resolver 832 to resolve the dependencies among the selected objects and fields included in the OLAP dataflow build specifications 812a-n. In yet another implementation, the constructor 822 uses a merger 842 to merge the resolved objects and fields into a global OLAP dataflow build specification 815.

Once the global OLAP dataflow build specification 815 is created, the process continues similar to the process illustrated in FIG. 3, such that the scheduler 102 decouples a global extraction job 818 implemented by the extractor 115 from loading and transformation operations 828 of schedule OLAP dataflow jobs. This includes making the data, incrementally extracted from the OLTP transaction updatable system 105, proactively and locally available to the loader and transformer 135 in the form of BUOBIDs 125. The OLAP analytic databases 145 are then efficiently built from the BUOBIDs 125, rather than from the on-disk OLTP transaction updatable system 105.

Some Particular Implementations

In one implementation, described is a method of creating and frequently updating multiple online analytic processing (OLAP) analytic databases from an online transaction processing (OLTP) transaction updatable system that includes transaction commit, rollback, and field level security capabilities. The method includes periodically and in parallel over multiple object sets of an OLTP transaction updatable system, using an extract process to incrementally replicate database objects and fields updated since a prior extraction, from the OLTP transaction updatable system, to multiple bulk updatable-only builder-input-datasets for respective object sets, from which multiple OLAP analytic databases are built and periodically updating the multiple OLAP analytic databases from respective subset combinations of the builder-input-datasets using a separate load process, following instructions in respective OLAP dataflow build specifications and a rebuild schedule.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, decoupled-ELT system, proliferation of coupled ELT processes, etc.

In one implementation, the OLAP dataflow build specifications identify different subsets of fields.

In one implementation, the rebuild schedule for the load process that builds the multiple OLAP analytic databases is decoupled from schedule for the extract process, thereby allowing the load process to independently update the multiple OLAP analytic databases from the subset combinations of the builder-input-datasets.

In one implementation, the method further includes identifying objects and fields required in the OLAP dataflow build specifications, calculating a union of the required objects and fields, and automatically modifying the extract process to incrementally replicate the required objects and fields.

In some implementations, the method also includes automatically integrating the extract process and OLAP dataflow jobs by responsive to creation of a new and/or modified OLAP dataflow build specification that requires extraction of a new field by the extract process, automatically modifying the extract process to include the new field, running an initial extract process to populate objects in the builder-input-datasets that include the new field, and after the initial extract, including the new field in incremental extraction.

In one implementation, the method further includes creating an additional bulk updatable-only builder-input-dataset from an external system, other than the OLTP transaction updatable system. In such an implementation, during the periodic updating, the additional builder-input-dataset is merged into the builder-input-datasets using a separate load process; following instructions in respective OLAP dataflow build specifications.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

In another implementation, described is a method of transparently decoupling extraction from rebuilding of frequently updated multiple online analytic processing (OLAP) analytic databases from an online transaction processing (OLTP) transaction updatable system that includes transaction commit, rollback, and field level security capabilities. The method includes accessing OLAP dataflow build specifications that identify database objects and fields in the OLTP transaction updatable system for building the OLAP analytic databases, resolving and merging dependencies implied by the OLAP dataflow build specifications, and constructing an extract process that covers the dependencies on the database objects and fields in the OLTP transaction updatable system, and periodically and in parallel over multiple object sets of the OLTP transaction updatable system, using the constructed extract process to incrementally replicate the database objects and fields updated since a prior extraction, from the OLTP transaction updatable system, to multiple bulk updatable-only builder-input-datasets for respective object sets, from which multiple OLAP analytic databases are built.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

In one implementation, the OLAP dataflow build specifications are defined using a graphical user interface. In such an implementation, the method includes receiving selection of visual elements of the graphical user interface representing the database objects and fields for the constructed extract process to incrementally replicate the database objects and fields to the builder-input-datasets.

In another implementation, the method includes generating programmable code representing the defined OLAP dataflow build specifications and updating the OLAP dataflow build specifications and a corresponding extract process constructed based on the updated OLAP dataflow build specifications in dependence upon modifications to the programmable code.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

What is claimed is:

1. A method including:
   using a first extract process to extract database objects and fields from an online transaction processing (OLTP) transaction updatable system;
   periodically and in parallel over multiple object sets of the OLTP transaction updatable system, using a second extract process to incrementally extract at least one of the database objects and fields updated in the OLTP transaction updatable system since the first extract process;
   replicating the database objects and fields to multiple bulk updatable-only builder-input-datasets for respective object sets;
   building multiple online analytic processing (OLAP) analytic databases based at least in part on the multiple bulk updatable-only builder-input-datasets for the respective object sets; and
   periodically updating the multiple OLAP analytic databases from respective subset combinations of the builder-input-datasets using a separate load process based at least in part on respective OLAP dataflow build specifications and a rebuild schedule.

2. The method of claim 1, wherein the OLAP dataflow build specifications identify different subsets of fields.

3. The method of claim 1, wherein the rebuild schedule for the separate load process that builds the multiple OLAP analytic databases is decoupled from schedule for the extract process, thereby allowing the separate load process to independently update the multiple OLAP analytic databases from the respective subset combinations of the builder-input-datasets.

4. The method of claim 1, further including:
identifying objects and fields in the OLAP dataflow build specifications;
calculating a union of the identified objects and fields; and
automatically modifying the extract process to incrementally replicate the identified objects and fields.

5. The method of claim 1, further including:
automatically integrating the extract process and OLAP dataflow jobs by:
responsive to creation of a new and/or modified OLAP dataflow build specification followed by extraction of a new field by the extract process, automatically modifying the extract process to include the new field;
running an initial extract process to populate objects in the builder-input-datasets that include the new field; and
after the initial extract, including the new field in an incremental extraction.

6. The method of claim 1, further including:
creating an additional bulk updatable-only builder-input-dataset from an external system, wherein the external system is different from the OLTP transaction updatable system; and
during the periodic updating, merging the additional builder-input-dataset into the builder-input-datasets using the separate load process, following instructions in respective OLAP dataflow build specifications.

7. The method of claim 1, wherein the OLTP transaction updatable system includes transaction commit, rollback, and field level security capabilities.

8. The method of claim 1, wherein the multiple bulk updatable-only builder-input-datasets for respective object sets are locally cached datasets.

9. A method including:
accessing online analytic processing (OLAP) dataflow build specifications that identify database objects and fields in an online transaction processing (OLTP) transaction updatable system for building OLAP analytic databases;
resolving dependencies between the database objects and fields identified by the OLAP dataflow build specifications;
merging the database objects and fields into a first OLAP dataflow build specification and constructing a first extract process and a second extract process that covers the resolved dependencies between the database objects and fields in the OLTP transaction updatable system;
using the first extract process to extract the database objects and fields from the OLTP transaction updatable system;
periodically and in parallel over multiple object sets of the OLTP transaction updatable system, using the second extract process to incrementally extract at least one of the database objects and fields updated in the OLTP transaction updatable system since the first extract process;
replicating the database objects and fields to multiple bulk updatable-only builder-input-datasets for respective object sets; and
building multiple OLAP analytic databases based at least in part on the multiple bulk updatable-only builder-input-datasets for the respective object sets and the OLAP dataflow build specifications.

10. The method of claim 9, wherein the OLAP dataflow build specifications are defined using a graphical user interface, further including:
receiving a selection of visual elements of the graphical user interface representing the database objects and fields for the constructed extract process to incrementally replicate the database objects and fields to the builder-input-datasets.

11. The method of claim 10, further including:
generating a programmable code representing the defined OLAP dataflow build specifications; and
updating the OLAP dataflow build specifications and a corresponding extract process constructed based on the updated OLAP dataflow build specifications in dependence upon modifications to the programmable code.

12. A non-transitory computer readable storage medium impressed with computer program instructions, the instructions, when executed on a processor, implement a method comprising:
using a first extract process to extract database objects and fields from an online transaction processing (OLTP) transaction updatable system;
periodically and in parallel over multiple object sets of the OLTP transaction updatable system, using a second extract process to incrementally extract at least one of the database objects and fields updated in the OLTP transaction updatable system since the first extract process;
replicating the database objects and fields to multiple bulk updatable-only builder-input-datasets for respective object sets;
building multiple online analytic processing (OLAP) analytic databases based at least in part on the multiple bulk updatable-only builder-input-datasets for the respective object sets; and
periodically updating the multiple OLAP analytic databases from respective subset combinations of the builder-input-datasets using a separate load process based at least in part on respective OLAP dataflow build specifications and a rebuild schedule.

13. The non-transitory computer readable storage medium of claim 12, wherein the rebuild schedule for the separate load process that builds the multiple OLAP analytic databases is decoupled from schedule for the extract process, thereby allowing the separate load process to independently update the multiple OLAP analytic databases from the respective subset combinations of the builder-input-datasets.

14. The non-transitory computer readable storage medium of claim 12, implementing the method further comprising:
identifying objects and fields in the OLAP dataflow build specifications;
calculating a union of the identified objects and fields; and
automatically modifying the extract process to incrementally replicate the identified objects and fields.

15. The non-transitory computer readable storage medium of claim 12, implementing the method further comprising:

creating an additional bulk updatable-only builder-input-dataset from an external system, wherein the external system is different from the OLTP transaction updatable system; and during the periodic updating, merging the additional builder-input-dataset into the builder-input-datasets using the separate load process, following instructions in respective OLAP dataflow build specifications.

16. A non-transitory computer readable storage medium impressed with computer program instructions, the instructions, when executed on a processor, implement a method comprising:

accessing online analytic processing (OLAP) dataflow build specifications that identify database objects and fields in an online transaction processing (OLTP) transaction updatable system for building OLAP analytic databases;

resolving dependencies between the database objects and fields identified by the OLAP dataflow build specifications;

merging the database objects and fields into a first OLAP dataflow build specification and constructing a first extract process and a second extract process that covers the resolved dependencies between the database objects and fields in the OLTP transaction updatable system;

using the first extract process to extract the database objects and fields from the OLTP transaction updatable system;

periodically and in parallel over multiple object sets of the OLTP transaction updatable system, using the second extract process to incrementally extract at least one of the database objects and fields updated in the OLTP transaction updatable system since the first extract process;

replicating the database objects and fields to multiple bulk updatable-only builder-input-datasets for respective object sets; and building multiple OLAP analytic databases based at least in part on the multiple bulk updatable-only builder-input-datasets for the respective object sets and the OLAP dataflow build specifications.

17. The non-transitory computer readable storage medium of claim 16, wherein the OLAP dataflow build specifications are defined using a graphical user interface, implementing the method further comprising:

receiving a selection of visual elements of the graphical user interface representing the database objects and fields for the constructed extract process to incrementally replicate the database objects and fields to the builder-input-datasets.

18. The non-transitory computer readable storage medium of claim 17, implementing the method further comprising:

generating a programmable code representing the defined OLAP dataflow build specifications; and updating the OLAP dataflow build specifications and a corresponding extract process constructed based on the updated OLAP dataflow build specifications in dependence upon modifications to the programmable code.

19. A system including one or more processors coupled to memory, the memory loaded with computer instructions, the instructions, when executed on the processors, implement a method comprising:

using a first extract process to extract database objects and fields from an online transaction processing (OLTP) transaction updatable system;

periodically and in parallel over multiple object sets of the OLTP transaction updatable system, using a second extract process to incrementally extract at least one of the database objects and fields updated in the OLTP transaction updatable system since the first extract process;

replicating the database objects and fields to multiple bulk updatable-only builder-input-datasets for respective object sets;

building multiple online analytic processing (OLAP) analytic databases based at least in part on the multiple bulk updatable-only builder-input-datasets for the respective object sets; and periodically updating the multiple OLAP analytic databases from respective subset combinations of the builder-input-datasets using a separate load process based at least in part on respective OLAP dataflow build specifications and a rebuild schedule.

20. A system including one or more processors coupled to memory, the memory loaded with computer instructions, the instructions, when executed on the processors, implement a method comprising:

accessing online analytic processing (OLAP) dataflow build specifications that identify database objects and fields in an online transaction processing (OLTP) transaction updatable system for building OLAP analytic databases;

resolving dependencies between the database objects and fields identified by the OLAP dataflow build specifications;

merging the database objects and fields into a first OLAP dataflow build specification and constructing a first extract process and a second extract process that covers the resolved dependencies between the database objects and fields in the OLTP transaction updatable system;

using the first extract process to extract the database objects and fields from the OLTP transaction updatable system;

periodically and in parallel over multiple object sets of the OLTP transaction updatable system, using the second extract process to incrementally extract at least one of the database objects and fields updated in the OLTP transaction updatable system since the first extract process;

replicating the database objects and fields to multiple bulk updatable-only builder-input-datasets for respective object sets; and building multiple OLAP analytic databases based at least in part on the multiple bulk updatable-only builder-input-datasets for the respective object sets and the OLAP dataflow build specifications.

* * * * *